(12) United States Patent
Lee et al.

(10) Patent No.: US 11,782,835 B2
(45) Date of Patent: Oct. 10, 2023

(54) HOST APPARATUS, HETEROGENEOUS SYSTEM ARCHITECTURE DEVICE, AND HETEROGENEOUS SYSTEM BASED ON UNIFIED VIRTUAL MEMORY

(71) Applicant: ELECTRONICS AND TELECOMMUNICATIONS RESEARCH INSTITUTE, Daejeon (KR)

(72) Inventors: Joo-Hyun Lee, Daejeon (KR); Young-Su Kwon, Daejeon (KR); Jin-Ho Han, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/536,573

(22) Filed: Nov. 29, 2021

(65) Prior Publication Data
US 2022/0171708 A1 Jun. 2, 2022

(30) Foreign Application Priority Data
Nov. 30, 2020 (KR) .......... 10-2020-0164826
Nov. 18, 2021 (KR) .......... 10-2021-0159414

(51) Int. Cl.
*G06F 12/08* (2016.01)
*G06F 8/60* (2018.01)
(Continued)

(52) U.S. Cl.
CPC ............ *G06F 12/084* (2013.01); *G06F 8/44* (2013.01); *G06F 8/60* (2013.01); *G06F 2212/657* (2013.01)

(58) Field of Classification Search
CPC . G06F 12/084; G06F 8/44; G06F 8/60; G06F 2212/657; G06F 9/30043;
(Continued)

(56) References Cited

U.S. PATENT DOCUMENTS 9,886,735 B2    2/2018 Soum et al.
2007/0130445 A1* 6/2007 Lau ............... G06F 15/173
                                              712/11
(Continued)

FOREIGN PATENT DOCUMENTS

KR  10-2015-0060871  6/2015
KR  10-2020-0098744  8/2020

OTHER PUBLICATIONS

Hyun-Moon Park et al., "A Development of Fusion Processor Architecture for Efficient Main Memory Access in CPU-GPU Environment," Journal of the KIECS, Feb. 29, 2016.

*Primary Examiner* — Masud K Khan
(74) *Attorney, Agent, or Firm* — KILE PARK REED & HOUTTEMAN PLLC

(57) ABSTRACT

Disclosed herein is a heterogeneous system based on unified virtual memory. The heterogeneous system based on unified virtual memory may include a host for compiling a kernel program, which is source code of a user application, in a binary form and delivering the compiled kernel program to a heterogenous system architecture device, the heterogenous system architecture device for processing operation of the kernel program delivered from the host in parallel using two or more different types of processing elements, and unified virtual memory shared between the host and the heterogenous system architecture device.

12 Claims, 7 Drawing Sheets

(51) Int. Cl.
*G06F 8/41* (2018.01)
*G06F 12/084* (2016.01)

(58) Field of Classification Search
CPC .. G06F 9/30101; G06F 9/544; G06F 12/0875; G06F 12/1027
See application file for complete search history.

(56) References Cited

U.S. PATENT DOCUMENTS

| | | | |
|---|---|---|---|
| 2011/0153957 A1* | 6/2011 | Gao | G06T 1/20 |
| | | | 711/147 |
| 2014/0204098 A1* | 7/2014 | Dietrich | G06F 12/08 |
| | | | 345/557 |
| 2015/0286565 A1 | 10/2015 | De et al. | |
| 2015/0347107 A1* | 12/2015 | Munshi | G06F 8/47 |
| | | | 717/147 |
| 2016/0019168 A1 | 1/2016 | Rychlik et al. | |
| 2016/0274636 A1 | 9/2016 | Kim | |
| 2018/0329819 A1* | 11/2018 | Hagersten | G06F 12/082 |
| 2018/0373497 A1* | 12/2018 | Gschwind | G06F 7/483 |
| 2019/0228344 A1 | 7/2019 | Hong et al. | |
| 2020/0218660 A1* | 7/2020 | Merritt | G06F 12/1063 |

* cited by examiner

HOST APPARATUS, HETEROGENEOUS SYSTEM ARCHITECTURE DEVICE, AND HETEROGENEOUS SYSTEM BASED ON UNIFIED VIRTUAL MEMORY

CROSS REFERENCE TO RELATED APPLICATIONS

This application claims the benefit of Korean Patent Application No. 10-2020-0164826, filed Nov. 30, 2020, and No. 10-2021-0159414, filed Nov. 18, 2021, which are hereby incorporated by reference in their entireties into this application.

BACKGROUND OF THE INVENTION

1. Technical Field

The disclosed embodiment relates to technology for sharing main memory in Heterogenous System Architecture (HSA) configured with various types of hardware.

2. Description of the Related Art

A current system based on a Graphic Processor Unit (GPU) is configured as a device separate from a host, and uses a separate GPU Memory (GDDR), rather than sharing main memory. Accordingly, after data processing by the GPU is completed, the resultant data stored in the GPU Memory (GDDR) is again transmitted to the main memory of the host via PCIe and an interface buffer.

As described above, because the current GPU technology is configured such that the memory of a host is separate from the memory of a GPU, it is necessary to transfer data therebetween. This may decrease processing speed and complicate configuration due to interface configuration and the like.

SUMMARY OF THE INVENTION

An object of the disclosed embodiment is to enable the main memory of a host and device memory to be used in an integrated manner, rather than being separate as in the conventional GPU technology.

Another object of the disclosed embodiment is to propose an interface and an execution model for offloading the operation load of a host onto a device, thereby quickly processing the operation in a heterogeneous system.

A heterogenous system based on unified virtual memory according to an embodiment may include a host for compiling a kernel program, which is source code of a user application, in a binary form and delivering the same to a heterogenous system architecture (HSA) device, the heterogeneous system architecture (HSA) device for processing operation of the kernel program delivered from the host in parallel using two or more different types of processing elements, and the unified virtual memory shared between the host and the HSA device.

Here, each of the two or more different types of processing elements may include multiple processor cores for executing the kernel program. Each of the multiple processor cores may include a general-purpose register used in order for the processor core to execute instructions included in the kernel program and a control status register in which data generated by the processor core is stored, may read data stored in the control status register and store the same in the general-purpose register using a read control status register command, and may store data of the general-purpose register in the control status register using a write control status register command.

Here, the read control status register command may include a control status register address at which data to be read is stored, a destination corresponding to a general-purpose register in which the data is to be stored, and a code indicating the read control status register command.

Here, the write control status register command may include a control status register address at which data is to be stored, a source corresponding to a general-purpose register in which the data to be written is stored, and a code indicating the write control status register command.

Here, each of the two or more different types of processing elements may include multiple processor cores for executing the kernel program and at least one address-mapping cache for mapping an area starting from a first start address and having a predetermined size in bytes in a memory address area generated by each of the multiple processor cores executing the kernel program to an area starting from a second start address and having the predetermined size in bytes in a virtual address area of the unified virtual memory.

Here, the host may set address-mapping configuration values, including a first start address, a second start address, and a size in bytes used in each of the at least one address-mapping cache, and deliver the same to the HSA device, and the HSA device may further include a configuration-setting unit for configuring the address-mapping cache to match the address-mapping configuration values delivered from the host.

Here, the at least one address-mapping cache may include at least one of private memory caches exclusively used by corresponding ones of the multiple processor cores, an instruction memory cache that operates by being mapped to an instruction memory area in which instructions executed by all processor cores included in the HSA device are included, a local memory cache that is used for a read operation by being allocated as a memory area shared by all processor cores included in a single processing element, and a global memory cache that operates by being allocated as a global memory area shared by all processing elements.

Here, the host may include the user application for setting a first start address and a size in bytes used in the global memory cache, a kernel compiler for compiling the kernel program and setting a second start address and a size in bytes used in each of the instruction memory cache, the private memory caches, the local memory cache, and the global memory cache, a runtime for delivering values set by the user application and the kernel compiler to a device driver, and the device driver for setting first start addresses used in the instruction memory cache, the private memory caches, the local memory cache, and the global memory cache and setting a configuration of the HSA device based on address-mapping configuration values including the values delivered from the runtime and values set thereby.

Here, the kernel compiler may deploy start code and the compiled kernel program in a memory address structure including the set second start address and the size in bytes, the start code may include an instruction for loading processor configuration data, generated by the device driver for each of the processor cores, onto a control status register, and the processor core may execute the kernel program by acquiring the configuration data using the instruction for loading data onto the control status register when needing the processor configuration data during execution of the kernel program.

A host apparatus according to an embodiment may include a kernel compiler for compiling a kernel program, which is source code of a user application, in a binary form and a runtime for delivering the compiled kernel program to a heterogeneous system architecture (HSA) device for processing operation of the compiled kernel program in parallel using two or more different types of processing elements, and may share unified virtual memory with the HSA device.

Here, each of the two or more different types of processing elements may include multiple processor cores for executing the kernel program and at least one address-mapping cache for mapping an area starting from a first start address and having a predetermined size in bytes in a memory address area, generated by each of the multiple processor cores executing the kernel program, to an area starting from a second start address and having the predetermined size in bytes in a virtual address area of the unified virtual memory. The host apparatus may set address-mapping configuration values, including a first start address, a second start address, and a size in bytes used in each of the at least one address-mapping cache, and deliver the same to the HSA device, and the HSA device may configure the address-mapping cache to match the address-mapping configuration values delivered from the host apparatus.

Here, the at least one address-mapping cache may include at least one of private memory caches exclusively used by corresponding ones of the multiple processor cores, an instruction memory cache that operates by being mapped to an instruction memory area in which instructions executed by all processor cores included in the HSA device are included, a local memory cache that is used for a read operation by being allocated as a memory area shared by all processor cores included in a single processing element, and a global memory cache that operates by being allocated as a global memory area shared by all processing elements. The host apparatus may include a user application for setting a first start address and a size in bytes used in the global memory cache, a kernel compiler for compiling the kernel program and setting a second start address and a size in bytes used in each of the instruction memory cache, the private memory caches, the local memory cache, and the global memory cache, a runtime for delivering values set by the user application and the kernel compiler to a device driver, and the device driver for setting first start addresses used in the instruction memory cache, the private memory caches, the local memory cache, and the global memory cache and setting a configuration of the HSA device based on the address-mapping configuration values including the values delivered from the runtime and values set thereby.

Here, the kernel compiler may deploy start code and the compiled kernel program in a memory address structure including the set second start address and size in bytes, and the start code may include an instruction for loading processor configuration data, generated by the device driver for each of the processor cores, onto a control status register.

A heterogeneous system architecture (HSA) device according to an embodiment may include two or more different types of processing elements for processing operation of a kernel program delivered from a host in parallel. Each of the two or more different types of processing elements may include multiple processor cores for executing the kernel program, and the HSA device may share unified virtual memory with the host.

Here, each of the multiple processor cores may include a general-purpose register used in order for the processor core to execute instructions included in the kernel program and a control status register in which data generated by the processor core is stored, may read data stored in the control status register and store the same in the general-purpose register using a read control status register command, and may store data of the general-purpose register in the control status register using a write control status register command.

Here, the read control status register command may include a control status register address at which data to be read is stored, a destination corresponding to a general-purpose register in which the data is to be stored, and a code indicating the read control status register command, and the write control status register command may include a control status register address at which data is to be stored, a source corresponding to a general-purpose register in which the data to be written is stored, and a code indicating the write control status register command.

Here, each of the two or more different types of processing elements may include multiple processor cores for executing the kernel program and at least one address-mapping cache for mapping an area starting from a first start address and having a predetermined size in bytes in a memory address area generated by each of the multiple processor cores executing the kernel program to an area starting from a second start address and having the predetermined size in bytes in a virtual address area of the unified virtual memory.

Here, the host may set address-mapping configuration values, including a first start address, a second start address, and a size in bytes used in each of the at least one address-mapping cache, and deliver the same to the HSA device, and the HSA device may further include a configuration-setting unit for configuring the address-mapping cache to match the address-mapping configuration values delivered from the host.

Here, the at least one address-mapping cache may include at least one of private memory caches exclusively used by corresponding ones of the multiple processor cores, an instruction memory cache that operates by being mapped to an instruction memory area in which instructions executed by all processor cores included in the HSA device are included, a local memory cache that is used for a read operation by being allocated as a memory area shared by all processor cores included in a single processing element, and a global memory cache that operates by being allocated as a global memory area shared by all processing elements.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
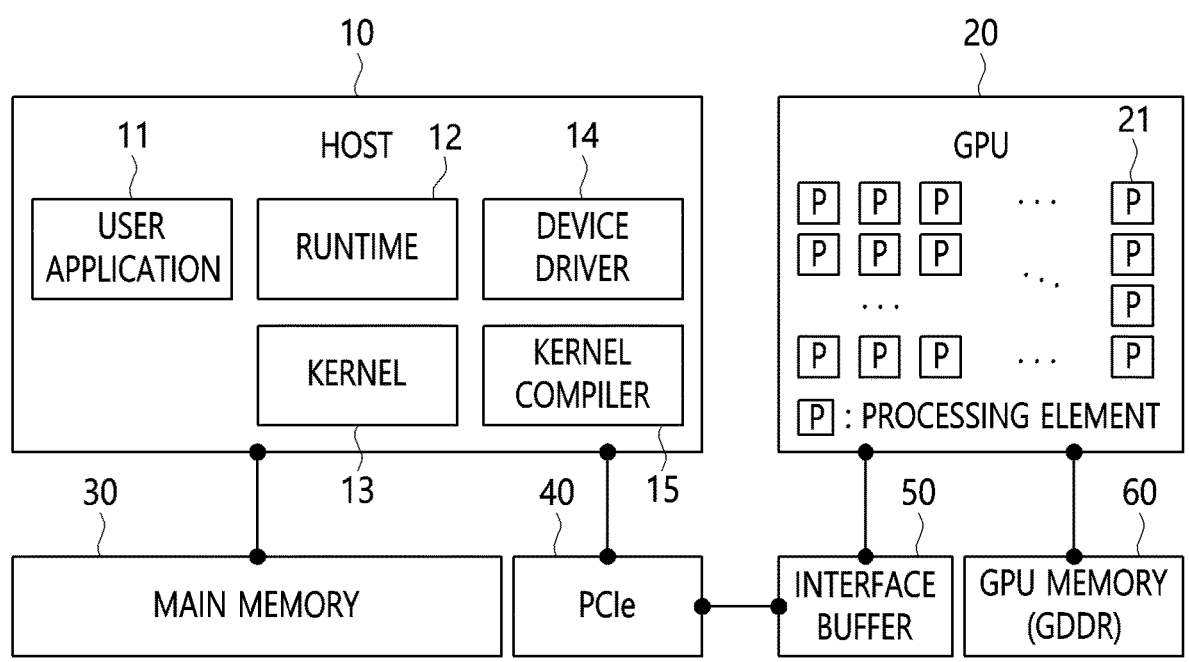
FIG. 1 is a schematic block diagram of a system based on a Graphic Processor Unit (GPU)

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, a heterogeneous system based on unified virtual memory according to an embodiment will be described in detail with reference to FIGS. 1 to 9.

Figure 2:
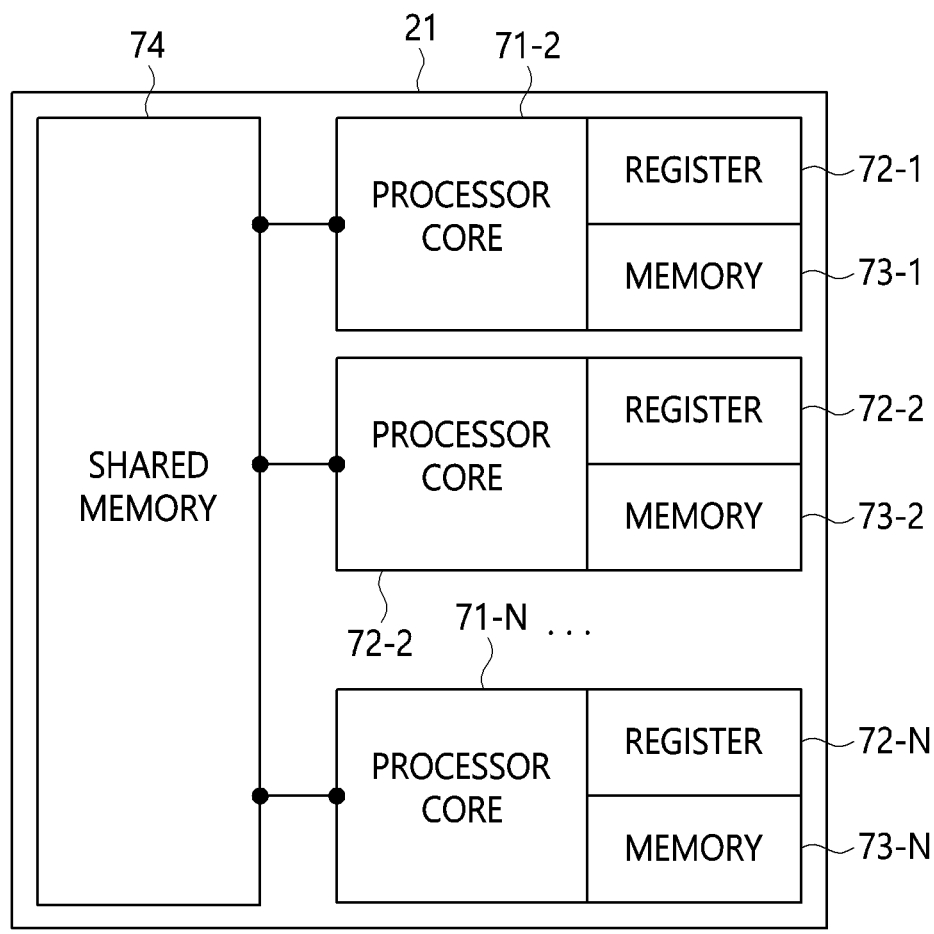
FIG. 2 is a block diagram of the internal configuration of a processing element of a GPU.

FIG. 1 is a schematic block diagram of a system based on a Graphic Processor Unit (GPU), and FIG. 2 is a block diagram of the internal configuration of a processing element of a GPU.

Referring to FIG. 1, the system based on a GPU may include a host 10 and a GPU 20.

The host 10 may include a user application 11, a runtime 12, a kernel 13, a device driver 14, and a kernel compiler 15.

The user application 11 is software written by a user and developed for a particular purpose using application interface APIs provided from the runtime 12.

The runtime 12 may be software that provides APIs for performing operations in parallel and interworking with the GPU 20 when it performs a large amount of operations using the GPU 20. Therefore, the runtime 12 is provided to users along with the GPU 20.

The kernel 13 may be the source code of software executed by the processor core in the GPU 20. That is, the kernel 13 may be program source code written in C/C++.

The kernel compiler 14 compiles the kernel 13 and thereby generates code in a binary form so as to be executable by the processor core in the GPU.

The device driver 15 is software for configuration of the actual physical GPU for control of the GPU required for the runtime 12. Here, the process of directly accessing the hardware of the system, such as GPU initialization and configuration, and the like, requires a system call in the OS, but general users are not allowed to directly call the same, so a device driver 15 separate from the runtime software 12 is provided instead.

Meanwhile, the GPU 20 includes multiple processing elements 21 therein.

Referring to FIG. 2, each of the processing elements 21 includes multiple processor cores 71-1, 71-2, . . . , 71-N therein.

The processor cores 71-1, 71-2, . . . , 71-N have individual registers 72-1, 72-2, . . . , 72-N or individual memory devices 73-1, 73-2, . . . , 73-N, each of which is capable of being exclusively used by a corresponding one of the processor cores.

Also, the processing element 21 includes shared memory 74 that is shared among the processor cores 71-1, 71-2, . . . , 71-N.

Referring to FIG. 1 and FIG. 2, a general GPU-based system is configured such that the shared memory 74 and the memory in the processor cores 71-1, 71-2, . . . , 71-N are configured as hardware that is physically separate from GPU memory (GDDR) 60.

A series of processes, such as the above-mentioned compiling, data delivery, GPU initialization and execution, and the like, is processed by the runtime software 12.

When the host 10 delivers the kernel 13, which is compiled to a binary form, to the GPU 20 along with operation data, each of the multiple processor cores in the GPU executes kernel software, thereby processing the data.

Here, the host 10 delivers (copies) the kernel software and data to be processed to the GPU 20 through interfaces such as PCIe 40, an interface buffer 50, and the like.

This is because the current GPU 20, which is a device separate from the host 10, uses separate GPU memory (GDDR) 60, rather than sharing main memory 30, as illustrated in FIG. 1.

Accordingly, after data processing in the GPU 20 is completed, the resultant data stored in the GPU memory (GDDR) 60 is again transmitted to the main memory 30 of the host 10 via the PCIe 40 and the interface buffer 50.

As described above, because the conventional GPU technology is configured such that the memory of a host is separate from the memory of a GPU, data transfer therebetween is required, which decreases processing speed and complicates device configuration due to interface configuration and the like.

Therefore, in order to offload the operation of a host onto a Heterogeneous System Architecture (HSA) device and to enable multiple processor cores in the HSA device to process data in parallel in a Heterogeneous System Architecture (HSA) system to which technology for Unified Virtual Memory (UVM) between the host and the HSA device is applied, an embodiment presents an interface between the host and the HSA device and an execution model of the processor core in the HSA device.

Figure 3:
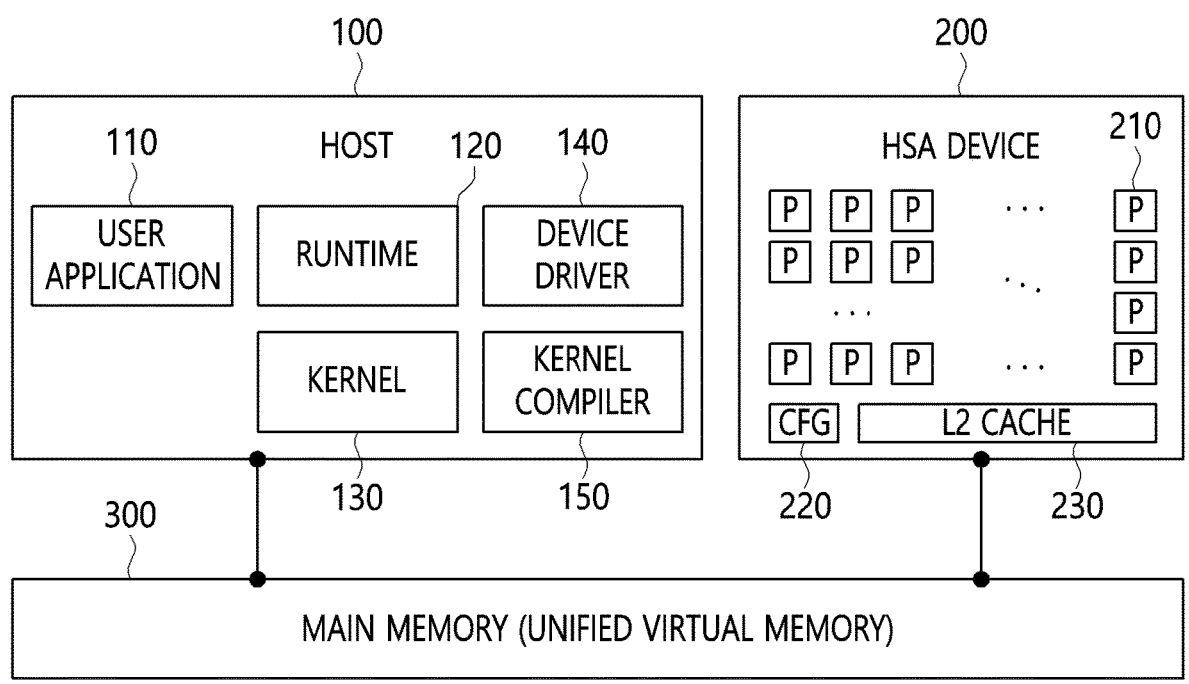
FIG. 3 is a block diagram of a heterogenous system based on unified virtual memory according to an embodiment.
Figure 4:
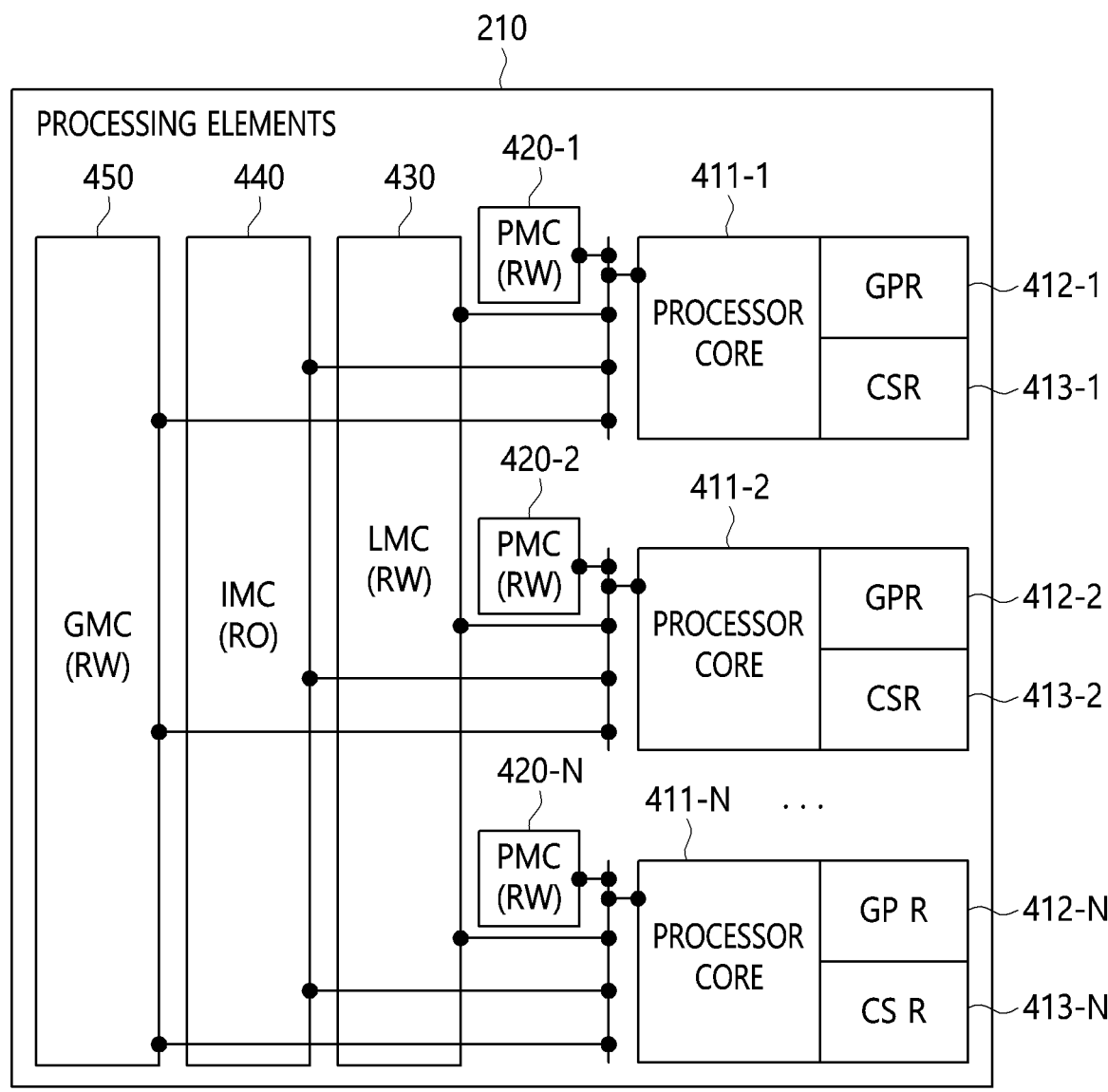
FIG. 4 is a block diagram of the internal configuration of a processing element according to an embodiment.

FIG. 3 is a block diagram of a heterogenous system based on unified virtual memory according to an embodiment, and FIG. 4 is a block diagram of the internal configuration of a processing element according to an embodiment.

Referring to FIG. 3, a heterogenous system based on unified virtual memory according to an embodiment is configured with a host 100 and a Heterogeneous System Architecture (HSA) device (referred to as a 'HSA device' hereinbelow) 200, and may include Unified Virtual Memory (UVM) 300 shared between the host 100 and the HSA device 200.

The host 100 compiles a kernel program, which is the source code of a user application 110, in a binary form and delivers the compiled kernel program to the HSA device 200.

Specifically, the host 100 includes the user application 110, a runtime 120, a kernel 130, a device driver 140, and a kernel compiler. The components of the host 100 perform the same function as the functions described above with reference to FIG. 1. However, because the main memory 30 illustrated in FIG. 1 operates as unified virtual memory 300 in FIG. 3 according to an embodiment, the components of the host 100 perform additional functions corresponding thereto. A detailed description thereof will be made later with reference to FIGS. 8 and 9.

The HSA device 200 processes the operation of the kernel program received from the host 100 in parallel using two or more different types of processing elements 210.

A configuration (CFG) setting unit 220 sets configuration data that is required when components included in the processing element 210 execute the kernel program. A detailed description thereof will be made later with reference to Table 1 and Table 2.

An L2 cache 230 has a general cache controller and a general cache memory structure, rather than an address-mapping function to be described later.

Referring to FIG. 4, each of the two or more different types of processing elements 210 may include multiple processor cores 411-1, 411-2, ..., 411-N for executing the kernel program delivered from the host 100.

Here, the multiple processor cores 411-1, 411-2, ..., 411-N may include general-purpose registers (GRP) 412-1, 412-2, ..., 412-N respectively built therein and control status registers (CSR) 413-1, 413-2, ..., 413-N respectively built therein.

The general-purpose registers 412-1, 412-2, ..., 412-N may be used in order for the processor cores 411-1, 411-2, ..., 411-N to execute instructions included in the kernel program.

The control status registers 413-1, 413-2, ..., 413-N may be used to store data that is generated when the processor cores 411-1, 411-2, ..., 411-N execute the kernel program.

The processor cores 411-1, 411-2, ..., 411-N read data from the control status registers 413-1, 413-2, ..., 413-N and store the same in the general-purpose registers 412-1, 412-2, ..., 412-N using a read control status register command (Read CSR, RDCSR).

Figure 5:
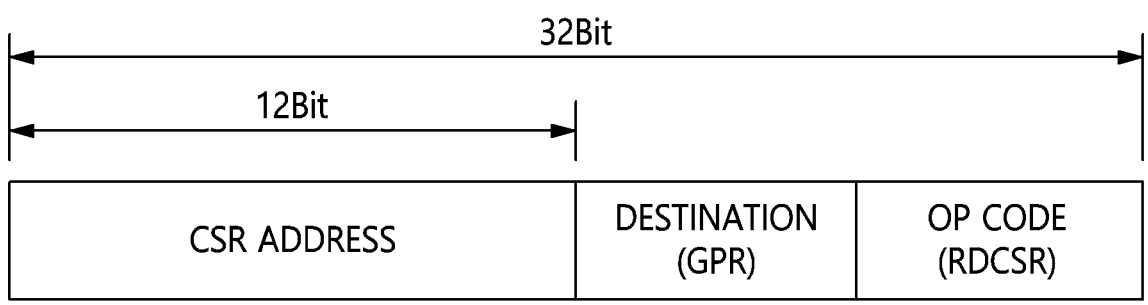
FIG. 5 is an exemplary view of a read control status register command according to an embodiment.

FIG. 5 is an exemplary view of a read control status register command according to an embodiment.

Referring to FIG. 5, the read control status register command may include the address of a control status register (CSR address) in which the data to be read is stored, a destination corresponding to a general-purpose register (GPR) in which the data is to be stored, and an OP code indicating the read control status register command (RDCSR).

Also, the processor cores 411-1, 411-2, ..., 411-N may store data of the general-purpose registers 412-1, 412-2, ..., 412-N in the control status registers 413-1, 413-2, ..., 413-N using a write control status register command (Write CSR, WRCSR).

Figure 6:
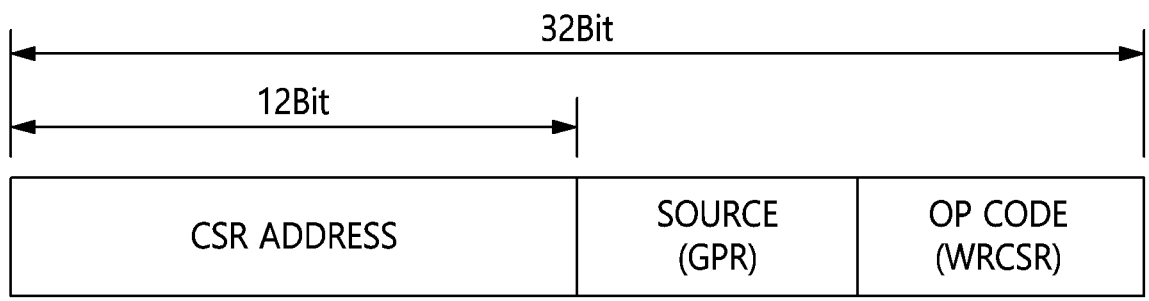
FIG. 6 is an exemplary view of a write control status register command according to an embodiment.

FIG. 6 is an exemplary view of a write control status register command according to an embodiment.

Referring to FIG. 6, the write control status register command may include the address of a control status register (CSR address) in which data is to be stored, a source corresponding to a general-purpose register (GPR) in which the data to be written is stored, and an OP code indicating the write control status register command (WRCSR).

Meanwhile, referring again to FIG. 4, the processing element 210 may include at least one address-mapping cache (ADDR_MAPPING_CACHE). This is used to map the address of the unified virtual memory 300 used by the host 100 to the address used by the HSA device 200 because the host 100 and the HSA device 200 share the unified virtual memory 300 therebetween according to an embodiment.

Figure 7:
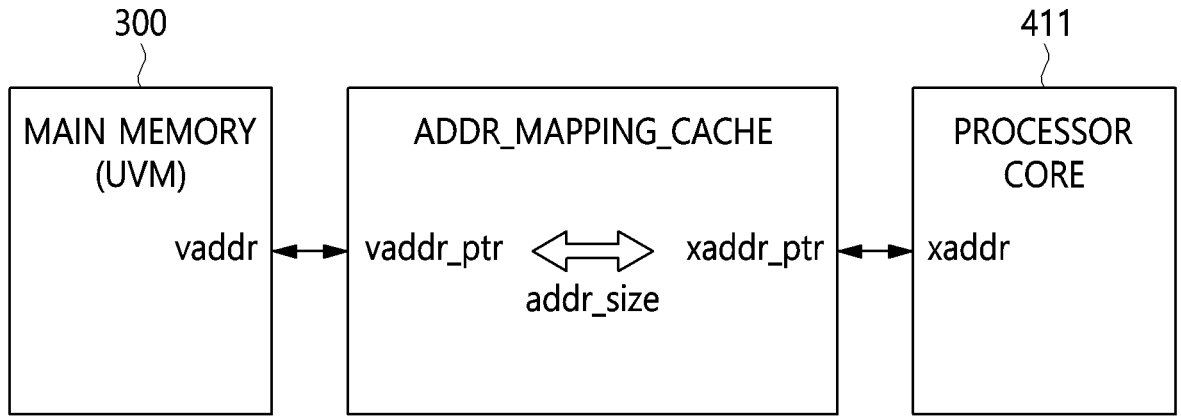
FIG. 7 is a view for explaining address mapping in an address-mapping cache according to an embodiment.

FIG. 7 is a view for explaining address mapping in an address-mapping cache according to an embodiment.

Referring to FIG. 7, each address-mapping cache maps an area starting from a first start address (xaddr_ptr) and having a predetermined size in bytes (addr_size) in the memory address (xaddr) area, which is generated by a processor core 411 executing a kernel program, to an area starting from a second start address (vaddr_ptr) and having the predetermined size in bytes (addr_size) in the virtual address area of unified virtual memory 300.

The first start address (xaddr_ptr), the second start address (vaddr_ptr), and the size (addr_size) may be set by the host 100 as address-mapping configuration values.

Also, when the address-mapping cache is not operating, any of the first start address (xaddr_ptr), the second start address (vaddr_ptr), and the size (addr_size) may be changed using software outside the address-mapping cache.

Referring again to FIG. 4, the processing element 210 includes Private Memory Caches (PMCs) 420-1, 420-2, ..., 420-N, a Local Memory Cache (LMC) 430, an Instruction Memory Cache (IMC) 440, and a Global Memory Cache (GMC) 450 as the address-mapping caches described above.

Among these caches, the private memory caches 420-1, 420-2, ..., 420-N, the local memory cache 430, and the global memory cache 450 are cache memory and cache controllers performing address-mapping functions of the same structure, and perform memory data access and cache operations. On the other hand, the instruction memory cache 440 performs a read-only cache function such that only reading therefrom by the processor cores 411-1, 411-2, ..., 411-N is permitted.

The private memory caches 420-1, 420-2, ..., 420-N are exclusively used by corresponding ones among the multiple processor cores 411-1, 411-2, ..., 411-N. That is, each of the private memory caches 420-1, 420-2, ..., 420-N indicates cache memory of a memory area that is used solely by a single processor core by being located in an area, such as a stack, heap memory, and the like for the single processor core executing a program.

The local memory cache 430 is assigned as a shared memory area that is shared by all of the processor cores 411-1, 411-2, ..., 411-N included in a single processing element 210, and is used when a read operation is performed.

The global memory cache 450 operates in the state of being assigned as a global memory area shared by all processing elements.

The instruction memory cache 440 operates by being mapped to an instruction memory area in which instructions executed by all of the processor cores 411-1, 411-2, ..., 411-N included in the HSA device 200 are included.

In an embodiment, all of the processor cores 411-1, 411-2, ..., 411-N of the HSA device 200 execute a Single-Program Multiple-Data (SPMD) programming model. Therefore, all of the processor cores 411-1, 411-2, ..., 411-N execute the same program, thus accessing the same area of instruction memory. Accordingly, all of the processor cores 411-1, 411-2, ..., 411-N share and use a single instruction memory cache 440.

Here, because it is an instruction cache, the instruction memory cache 440 is a read-only cache memory that is used only for a read operation by the processor cores 411-1, 411-2, ..., 411-N, as described above.

Meanwhile, each of the private memory caches 420-1, 420-2, ..., 420-N, the local memory cache 430, the instruction memory cache 440, and the global memory cache 450 needs to preset address-mapping configuration values, including a first start address (xaddr_ptr), a second start address (vaddr_ptr), and a size (addr_size), in order to operate as an address-mapping cache.

Accordingly, as illustrated in FIG. 3, the HSA device 200 may further include a configuration-setting unit (CFG) 220 for configuring each of the private memory caches 420-1, 420-2, ..., 420-N, the local memory cache 430, the instruction memory cache 440, and the global memory cache 450 to match the address-mapping configuration values delivered from the host 100, as described above.

The configuration values for an execution model, which are set by the configuration-setting unit 220, are as shown in Table 1 below.

used in the global memory cache 450. That is, the user application 110 allocates memory for the global memory and delivers the values of gmc_vaddr_ptr and gmc_addr_size to the device driver 140 via the runtime 120 as the result of allocation.

The kernel compiler 150 compiles a kernel program and sets the first start address and the size in bytes that are used in each of the private memory caches 420-1, 420-2, ..., 420-N, the local memory cache 430, the instruction memory cache 440, and the global memory cache 450. That is, the kernel compiler 150 sets a private memory area, an instruction memory area, a local memory area, and a global memory area and sets the values of imc_xaddr_ptr, imc_addr_size, pmc_xaddr_ptr, pmc_addr_size, lmc_xaddr_ptr, lmc_addr_size, and gmc_xaddr_ptr as the start addresses and sizes of the respective memory areas.

Here, the kernel compiler 150 deploys start code and the compiled kernel program in the memory address structure including the set first start addresses and the sizes in bytes.

Figure 8:
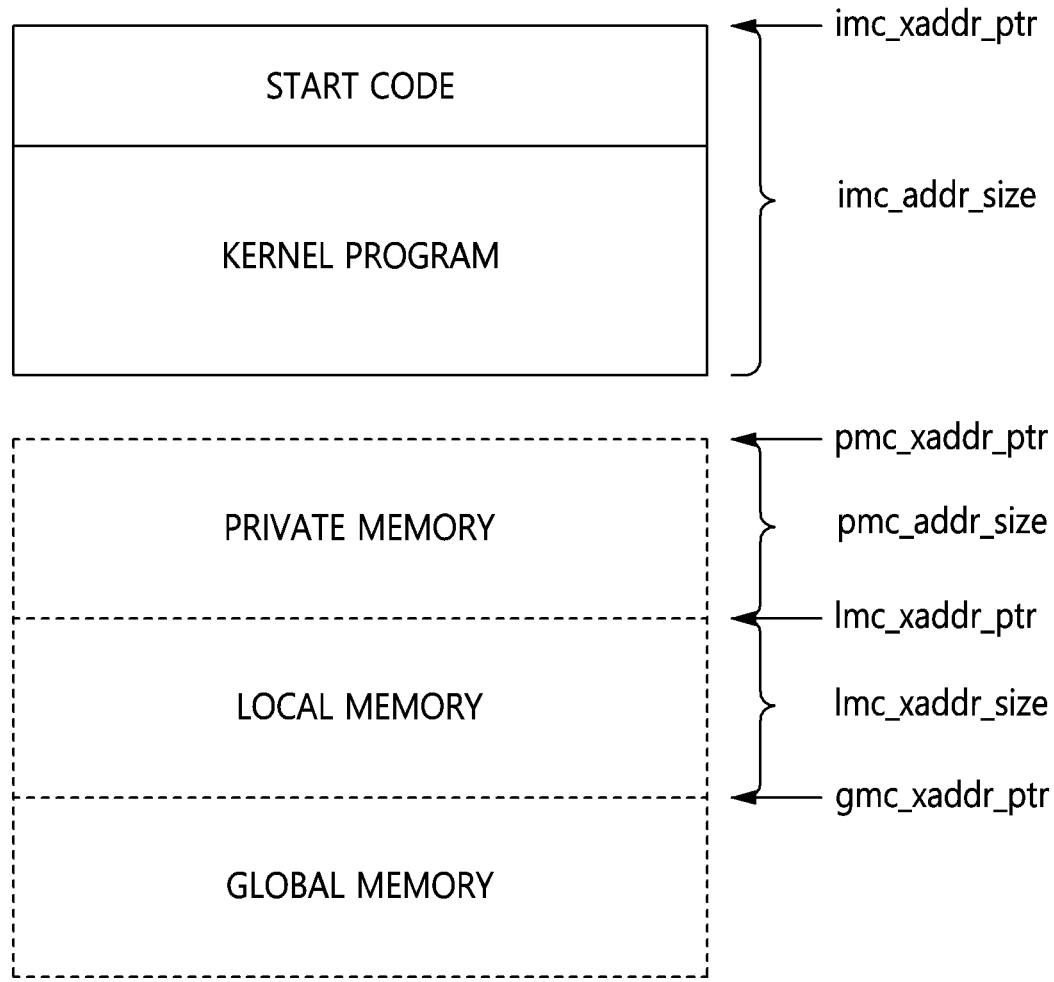
FIG. 8 is a memory address structure generated by a kernel compiler according to an embodiment.

FIG. 8 is a memory address structure generated by a kernel compiler according to an embodiment.

Referring to FIG. 8, the kernel compiler 150 deploys a compiled kernel program and generates and adds start code.

TABLE 1

| CFG block configuration value name | Description |
| --- | --- |
| gmc_vaddr_ptr | virtual address pointer for GMC address mapping |
| gmc_xaddr_ptr | processor core address pointer for GMC address mapping |
| gmc_addr_size | memory size (in bytes) for GMC address mapping |
| imc_vaddr_ptr | virtual address pointer for IMC address mapping |
| imc_xaddr_ptr | processor core address pointer for IMC address mapping |
| imc_addr_size | memory size (in bytes) for IMC address mapping |
| lmc_vaddr_ptr[0:nPE] | virtual address pointer for LMC address mapping |
| lmc_xaddr_ptr[0:nPE] | processor core address pointer for LMC address mapping |
| lmc_addr_size[0:nPE] | memory size (in bytes) for LMC address mapping |
| pmc_vaddr_ptr[0:nPE*nPC] | virtual address pointer for PMC address mapping |
| pmc_xaddr_ptr[0:nPE*nPC] | processor core address pointer for PMC address mapping |
| pmc_addr_size[0:nPE*nPC] | memory size (in bytes) for PMC address mapping |

The address-mapping configuration values in Table 1 may be set by the host 100 and delivered to the HSA device 200. Here, the components of the host 100 that set the configuration values included in Table 1 are listed in Table 2 below.

Here, the start code includes instructions for loading processor configuration data, which is generated by the device driver 140 for the respective processor cores 411-1, 411-2, ..., 411-N, onto control status registers 413-1,

TABLE 2

| CFG block configuration value name | component that sets and outputs CFG configuration value |
| --- | --- |
| gmc_vaddr_ptr | User Application |
| gmc_xaddr_ptr | Kernel Compiler and Linker |
| gmc_addr_size | User Application |
| imc_vaddr_ptr | Device Driver |
| imc_xaddr_ptr | Kernel Compiler and Linker |
| imc_addr_size | Kernel Compiler and Linker |
| lmc_vaddr_ptr[0:nPE] | Device Driver |
| lmc_xaddr_ptr[0:nPE] | Kernel Compiler and Linker |
| lmc_addr_size[0:nPE] | Kernel Compiler and Linker |
| pmc_vaddr_ptr[0:nPE*nPC] | Device Driver |
| pmc_xaddr_ptr[0:nPE*nPC] | Kernel Compiler and Linker |
| pmc_addr_size[0:nPE*nPC] | Kernel Compiler and Linker |

Accordingly, the respective roles of the user application 110, the runtime 120, the device driver 140, and the kernel compiler 150, which are the components of the host 100 illustrated in FIG. 3, are as follows.

According to an embodiment, the user application 110 sets the second start address and the size in bytes that are

413-2, ..., 413-N. Accordingly, when it needs the processor configuration data during execution of the kernel program, each of the processor cores 411-1, 411-2, ..., 411-N acquires the configuration data using the instruction for loading the processor configuration data onto the control status registers 413-1, 413-2, ..., 413-N, thereby executing the kernel program. Here, as described above with reference to FIG. 5 and FIG. 6, the configuration data may be acquired using the commands for accessing the control status register (CSR).

Referring again to FIG. 3, the runtime 120 delivers the values set by the user application 110 and the kernel compiler 150 to the device driver 140.

The device driver 140 sets the second start addresses to be used by the private memory caches 420-1, 420-2, ..., 420-N, the local memory cache 430, the instruction memory cache 440, and the global memory cache 450.

Then, the device driver 140 may set the configuration of the HSA device 200 using the address-mapping configuration values, including the values set thereby and the values delivered from the runtime 120.

Figure 9:
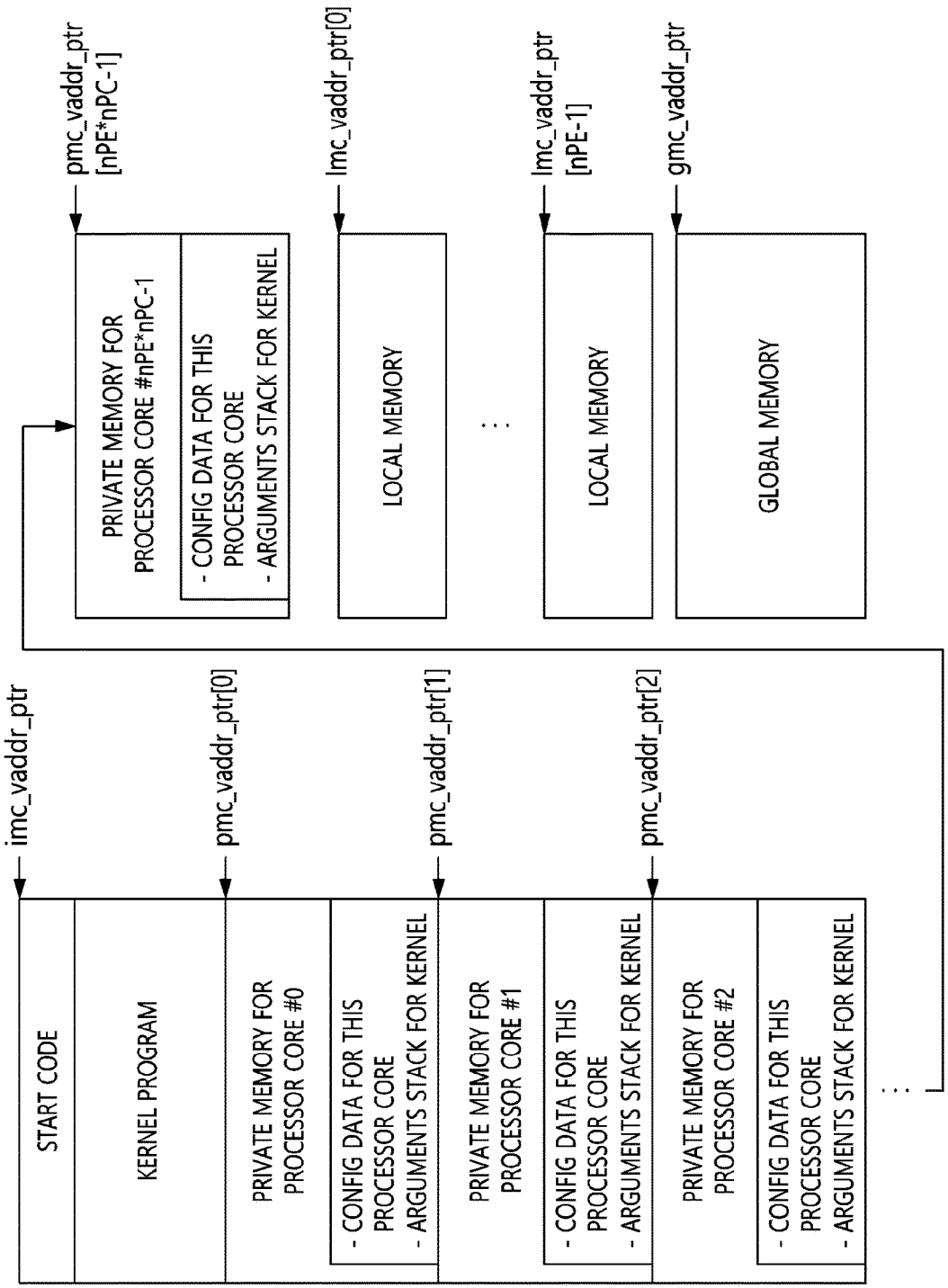
FIG. 9 is a structural diagram illustrating allocation of a memory address value by a device driver according to an embodiment.

FIG. 9 is a structural diagram illustrating allocation of memory address values by a device driver according to an embodiment.

Referring to FIG. 9, the device driver 140 allocates a global memory area at the virtual memory address of a system, thereby setting the value of gmc_vaddr_ptr.

Then, the device driver 140 allocates a single instruction memory area at a virtual memory address of the system, thereby setting the value of im_vaddr_ptr.

The device driver 140 assigns virtual memory addresses to local memory areas for respective processing elements 210 in the HSA device 200 and sets lmc_vaddr_ptr.

The device driver 140 assigns virtual memory addresses to private memory areas for respective processor cores 411-1, 411-2, ..., 411-N in each of the processing elements 210 in the HSA device 200, and sets pmc_vaddr_ptr.

The device driver 140 sets the configuration-setting unit 220 in the HSA device 200 using the values of imc_vaddr_ptr, gmc_vaddr_ptr, lmc_vaddr_ptr, and pmc_vaddr_ptr, which are set by the device driver 140, and the values of imc_xaddr_ptr, imc_addr_size, pmc_xaddr_ptr, pmc_addr_size, lmc_xaddr_ptr, lmc_addr_size, and gmc_xaddr_ptr, delivered from the runtime.

The values set in the configuration-setting unit 220 are delivered to corresponding address mapping blocks (ADDR_MAPPING_CACHE) to configure the address-mapping blocks.

After the configuration is completed as described above, when the HSA device 200 is run, processor cores in each of the processing elements 210 in the HSA device 200 load instructions from the address pointed to by imc_xaddr_ptr and start execution of a program.

When each of the processor cores 411-1, 411-2, ..., 411-N in each of the processing elements 210 accesses imc_xaddr_ptr, the instruction memory cache 440 accesses data at the virtual address of imc_vaddr_ptr corresponding to imc_xaddr_ptr and delivers the same, whereby all of the processor cores 411-1, 411-2, ..., 411-N share the same start code and the same kernel program.

The respective processor cores 411-1, 411-2, ..., 411-N in each of the processing elements 210 operate by outputting the same imc_xaddr value and the same lmc_xaddr value and access the unified virtual memory 300 using the same imc_vaddr and the same lmc_vaddr through the instruction memory cache 440 and the local memory cache 430 shared among the processor cores, thereby sharing and using the same data.

All of the processor cores 411-1, 411-2, ..., 411-N in all of the processing elements 210 in the HSA device 200 operate by outputting the same gmc_xaddr value and access the unified virtual memory 300 using the same gmc_vaddr through the shared global memory cache 450, thereby sharing and using the same data.

The respective processor cores 411-1, 411-2, ..., 411-N in each of the processing elements 210 in the HSA device 200 output the same pmc_xaddr value, but each of the processor cores 411-1, 411-2, ..., 411-N accesses the address of the unified virtual memory 300 to which the pmc_vaddr value points through a corresponding one of the private memory caches 420-1, 420-2, ..., 420-N, so the private memory caches 420-1, 420-2, ..., 420-N used by the respective processor cores 411-1 411-2, ..., 411-N contain different pieces of data.

Also, the start code shared among all of the processor cores 411-1, 411-2, ..., 411-N loads different pieces of configuration data, which are present in individual private memory areas assigned to the respective processor cores 411-1, 411-2, ..., 411-N, onto the CSR register areas individually assigned to the respective processor cores 411-1, 411-2, ..., 411-N.

When all of the processor cores 411-1, 411-2, ..., 411-N simultaneously execute the same kernel program shared therebetween, they read configuration data from their individual CSR areas, thereby processing different pieces of data.

After loading the configuration data, the start code shared among all of the processor cores 411-1, 411-2, ..., 411-N sets the stack pointers of the processor cores 411-1, 411-2, ..., 411-N to the start points of the argument stacks in the state in which the argument stacks are maintained, and then branches or jumps to the kernel program, thereby executing the kernel program. The kernel program fetches input argument information required for execution of the program from the stack, whereby the program may be executed.

According to the disclosed embodiment, a host and a heterogenous device share a single unified memory device, whereby the operation load of the host may be offloaded onto the device and multiple processor cores in the device may quickly process data in parallel.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A heterogenous system based on unified virtual memory, comprising:
   a host for compiling a kernel program, which is source code of a user application, in a binary form and delivering the compiled kernel program to a heterogenous system architecture (HSA) device;
   the heterogeneous system architecture (HSA) device for processing operation of the kernel program delivered from the host in parallel using two or more different types of processing elements; and
   the unified virtual memory shared between the host and the HSA device,
   wherein each of the two or more different types of processing elements includes:
      multiple processor cores for executing the kernel program, and
      at least one address-mapping cache for mapping an area starting from a first start address and having a predetermined size in bytes in a memory address area generated by each of the multiple processor cores executing the kernel program to an area starting from a second start address and having the predetermined size in bytes in a virtual address area of the unified virtual memory, wherein the at least one address-mapping cache includes at least one of:
- private memory caches exclusively used by corresponding ones of the multiple processor cores;
- an instruction memory cache that operates by being mapped to an instruction memory area in which instructions executed by all processor cores included in the HSA device are included;
- a local memory cache that is used for a read operation by being allocated as a memory area shared by all processor cores included in a single processing element; and
- a global memory cache that operates by being allocated as a global memory area shared by all processing elements, wherein each of the multiple processor cores in each of the two or more different types of processing elements output a same instruction memory cache processor core address pointer value and a same local memory cache processor core address pointer value and accesses the unified virtual memory using a same instruction memory cache virtual address pointer value and a same local memory cache virtual address pointer value through the instruction memory cache and the local memory cache shared among the multiple processor cores, thereby sharing and using the same data, and wherein each of the multiple processor cores in each of the two or more different types of processing elements outputs a same global memory cache processor core address pointer value and accesses the unified virtual memory using a same global memory cache virtual address pointer value through the global memory cache, thereby sharing and using the same data.

2. The heterogenous system of claim 1, wherein:
each of the two or more different types of processing elements includes multiple processor cores for executing the kernel program, and
each of the multiple processor cores includes a general-purpose register used in order for the processor core to execute instructions included in the kernel program and a control status register in which data generated by the processor core is stored; reads data stored in the control status register and stores the data in the general-purpose register using a read control status register command; and stores data of the general-purpose register in the control status register using a write control status register command.

3. The heterogenous system of claim 2, wherein:
the read control status register command includes a control status register address at which data to be read is stored, a destination corresponding to a general-purpose register in which the data is to be stored, and a code indicating the read control status register command, and
the write control status register command includes a control status register address at which data is to be stored, a source corresponding to a general-purpose register in which the data to be written is stored, and a code indicating the write control status register command.

4. The heterogenous system of claim 1, wherein;
the host sets address-mapping configuration values, including a first start address, a second start address, and a size in bytes used in each of the at least one address-mapping cache, and delivers the address-mapping configuration values to the HSA device, and
the HSA device further includes a configuration-setting unit for configuring the address-mapping cache to match the address-mapping configuration values delivered from the host.

5. The heterogenous system of claim 1, wherein the host includes
the user application for setting a first start address and a size in bytes used in the global memory cache;
a kernel compiler for compiling the kernel program and setting a first start address and a size in bytes used in each of the instruction memory cache, the private memory caches, the local memory cache, and the global memory cache;
a runtime for delivering values set by the user application and the kernel compiler to a device driver; and
the device driver for setting second start addresses used in the instruction memory cache, the private memory caches, the local memory cache, and the global memory cache and setting a configuration of the HSA device based on address-mapping configuration values including the values delivered from the runtime and values set thereby.

6. The heterogenous system of claim 5, wherein:
the kernel compiler deploys start code and the compiled kernel program in a memory address structure including the set second start address and the size in bytes,
the start code includes an instruction for loading processor configuration data, generated by the device driver for each of the processor cores, onto a control status register, and
the processor core executes the kernel program by acquiring the configuration data using the instruction for loading data onto the control status register when needing the processor configuration data during execution of the kernel program.

7. A host apparatus, comprising:
a kernel compiler for compiling a kernel program, which is source code of a user application, in a binary form;
a runtime for delivering the compiled kernel program to a heterogeneous system architecture (HSA) device for processing operation of the compiled kernel program in parallel using two or more different types of processing elements,
wherein:
the host apparatus shares unified virtual memory with the HSA device,
each of the two or more different types of processing elements includes multiple processor cores for executing the kernel program and at least one address-mapping cache for mapping an area starting from a first start address and having a predetermined size in bytes in a memory address area, generated by each of the multiple processor cores executing the kernel program, to an area starting from a second start address and having the predetermined size in bytes in a virtual address area of the unified virtual memory,
the host apparatus sets address-mapping configuration values, including a first start address, a second start address, and a size in bytes used in each of the at least one address-mapping cache, and delivers the address-mapping configuration values to the HSA device, the HSA device configures the address-mapping cache to match the address-mapping configuration values delivered from the host apparatus, the at least one address-mapping cache includes at least one of:
private memory caches exclusively used by corresponding ones of the multiple processor cores;
an instruction memory cache that operates by being mapped to an instruction memory area in which instructions executed by all processor cores included in the HSA device are included;
a local memory cache that is used for a read operation by being allocated as a memory area shared by all processor cores included in a single processing element; and
a global memory cache that operates by being allocated as a global memory area shared by all processing elements, and wherein the user application set a first start address and a size in bytes used in the global memory cache;

the kernel compiler compiles the kernel program and setting a first start address and a size in bytes used in each of the instruction memory cache, the private memory caches, the local memory cache, and the global memory cache; and the runtime delivers values set by the user application and the kernel compiler to a device driver; and the host apparatus includes the device driver for setting second start addresses used in the instruction memory cache, the private memory caches, the local memory caches, and the global memory cache and setting a configuration of the HSA device based on the address-mapping configuration values including the values delivered from the runtime and values set thereby.

8. The host device of claim 7, wherein:
the kernel compiler deploys start code and the compiled kernel program in a memory address structure including the set second start address and size in bytes, and
the start code includes an instruction for loading processor configuration data, generated by the device driver for each of the processor cores, onto a control status register.

9. A heterogeneous system architecture (HSA) device, comprising:
two or more different types of processing elements for processing operation of a kernel program delivered from a host in parallel,
wherein:
each of the two or more different types of processing elements includes multiple processor cores for executing the kernel program,
the HSA device shares unified virtual memory with the host,
each of the two or more different types of processing elements includes at least one address-mapping cache for mapping an area starting from a first start address and having a predetermined size in bytes in a memory address area generated by each of the multiple processor cores executing the kernel program to an area starting from a second start address and having the predetermined size in bytes in a virtual address area of the unified virtual memory,
wherein the at least one address-mapping cache includes at least one of:
private memory caches exclusively used by corresponding ones of the multiple processor cores;
an instruction memory cache that operates by being mapped to an instruction memory area in which instructions executed by all processor cores included in the HSA device are included;
a local memory cache that is used for a read operation by being allocated as a memory area shared by all processor cores included in a single processing element; and
a global memory cache that operates by being allocated as a global memory area shared by all processing elements,
wherein each of the multiple processor cores in each of the two or more different types of processing elements output a same instruction memory cache processor core address pointer value and a same local memory cache processor core address pointer value and accesses the unified virtual memory using a same instruction memory cache virtual address pointer value and a same local memory cache virtual address pointer value through the instruction memory cache and the local memory cache shared among the multiple processor cores, thereby sharing and using the same data, and
wherein each of the multiple processor cores in each of the two or more different types of processing elements outputs a same global memory cache processor core address pointer value and accesses the unified virtual memory using a same global memory cache virtual address pointer value through the global memory cache, thereby sharing and using the same data.

10. The heterogeneous system architecture (HSA) device of claim 9, wherein:
each of the multiple processor cores includes a general-purpose register used in order for the processor core to execute instructions included in the kernel program and a control status register in which data generated by the processor core is stored; reads data stored in the control status register and stores the data in the general-purpose register using a read control status register command; and stores data of the general-purpose register in the control status register using a write control status register command.

11. The heterogeneous system architecture (HSA) device of claim 10, wherein:
the read control status register command includes a control status register address at which data to be read is stored, a destination corresponding to a general-purpose register in which the data is to be stored, and a code indicating the read control status register command, and
the write control status register command includes a control status register address at which data is to be stored, a source corresponding to a general-purpose register in which the data to be written is stored, and a code indicating the write control status register command.

12. The heterogeneous system architecture (HSA) device of claim 9, wherein
the host sets address-mapping configuration values, including a first start address, a second start address, and a size in bytes used in each of the at least one address-mapping cache, and delivers the address-mapping configuration values to the HSA device, and
the HSA device further includes a configuration-setting unit for configuring the address-mapping cache to match the address-mapping configuration values delivered from the host.

* * * * *